(12) United States Patent
Weber et al.

(10) Patent No.: US 6,925,857 B2
(45) Date of Patent: Aug. 9, 2005

(54) METHOD OF DETERMINING AN AVERAGE LENGTH OF REINFORCING FIBER IN A SAMPLE OF REINFORCING FIBERS

(75) Inventors: Charles Weber, Onalaska, WI (US); Chris Rannenberg, Winona, WI (US)

(73) Assignee: Composite Products, Inc., Winona, MN (US)

( * ) Notice: Subject to any disclaimer, the term of this patent is extended or adjusted under 35 U.S.C. 154(b) by 0 days.

(21) Appl. No.: 10/914,033

(22) Filed: Aug. 5, 2004

(65) Prior Publication Data

US 2005/0005685 A1 Jan. 13, 2005

Related U.S. Application Data

(62) Division of application No. 10/138,555, filed on May 3, 2002, now abandoned.

(51) Int. Cl.[7] ............................. G01N 9/00; G01N 30/00
(52) U.S. Cl. ........................................ 73/64.54; 73/61.72
(58) Field of Search ............................. 73/64.54, 67.72, 73/61.73

(56) References Cited

U.S. PATENT DOCUMENTS

| | | |
|---|---|---|
| 1,141,727 A | 6/1915 | Seaman |
| 1,430,636 A | 10/1922 | Forgeson |
| 2,002,974 A | 5/1935 | Bennett et al. |
| 2,400,719 A | 5/1946 | Stackhouse |
| 3,366,237 A | 1/1968 | Suhm |
| 3,386,580 A | 6/1968 | Grabarczyk |
| 3,419,139 A | 12/1968 | Agthe |
| 3,756,400 A | 9/1973 | Kammori et al. |
| 3,800,943 A | 4/1974 | Riesbeck et al. |
| 3,831,753 A | 8/1974 | Gaylord et al. |
| 3,898,063 A | 8/1975 | Gazan |
| 3,943,754 A | 3/1976 | Orr, Jr. |
| 4,249,655 A | 2/1981 | Patureau et al. |
| 4,337,150 A | 6/1982 | Breunig |
| 4,381,669 A | 5/1983 | Peters |
| 4,519,244 A | 5/1985 | Meloy |
| 4,755,287 A | 7/1988 | Jones |
| 4,843,868 A | 7/1989 | Propst |
| 4,929,346 A | 5/1990 | Si-Lin |
| 5,059,310 A | 10/1991 | Fischer et al. |
| 5,222,605 A * | 6/1993 | Pogue ........................ 209/239 |
| 5,242,058 A | 9/1993 | Jones |
| 5,368,169 A | 11/1994 | Ensor |
| 5,776,216 A | 7/1998 | Yang |

* cited by examiner

*Primary Examiner*—Michael Cygan
(74) *Attorney, Agent, or Firm*—Moore, Hansen & Sumner, PLLP

(57) ABSTRACT

A method of determining an average length of reinforcing fiber in a sample of reinforcing fibers is disclosed. A sample of reinforcing fibers is weighed to obtain a total sample weight. The sample of reinforcing fibers is placed in a fiber separating mechanism and suspended in water. The water is stirred after which the water is allowed to settle such that the sample of reinforcing fiber divides into a plurality of fractions in separate sections of the fiber separating mechanism. Each fraction has reinforcing fibers of substantially similar lengths and is separately weighed. An average fiber length is calculated from the relative weights of each of the plurality of fractions and the total sample weight. In addition, a method of determining an average length of a reinforcing fiber in a composite material having a resin and a plurality of reinforcing fibers is disclosed.

20 Claims, 1 Drawing Sheet

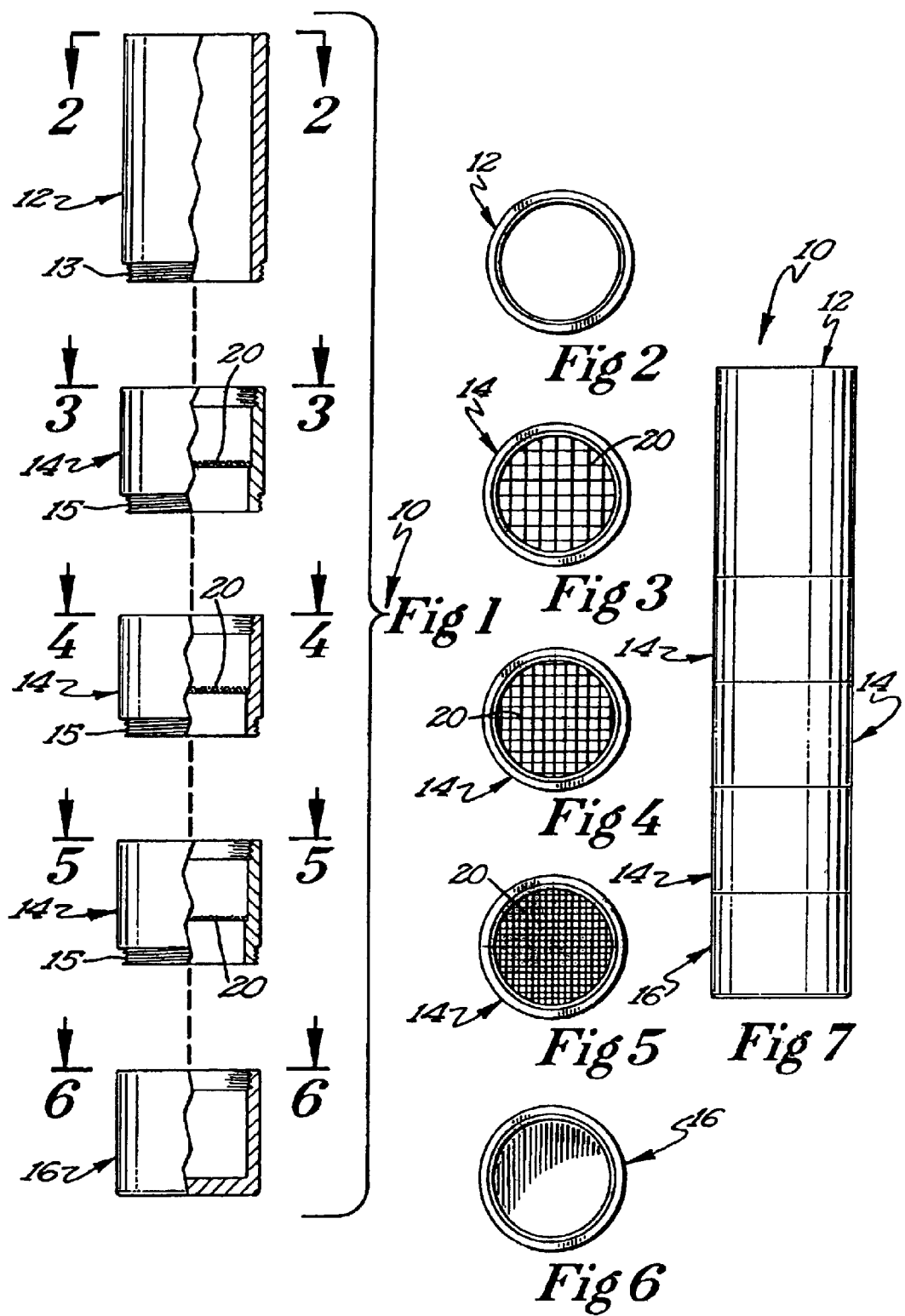

METHOD OF DETERMINING AN AVERAGE LENGTH OF REINFORCING FIBER IN A SAMPLE OF REINFORCING FIBERS

FIELD OF THE INVENTION

The present invention relates to the assessment of fiber lengths in reinforced thermoplastic composites. More specifically, the present invention relates to a method whereby fibers are extracted from a fiber reinforced thermoplastic composite and separated according to length to determine an average fiber length in the sample of the reinforced thermoplastic composite.

BACKGROUND OF THE INVENTION

In ensuring the uniformity of the physical properties of a given fiber reinforced thermoplastic composite, it is necessary to determine whether a given sample of composite material does indeed contain fibers of a specified length. In the past, this was accomplished by burning off the thermoplastic resin portion of the composite, leaving behind the reinforcing fibers. The reinforcing fibers would then be picked up using an electrostatically charged brush, typically fashioned of camel hair, and placed on a sampling surface such as a Petri dish. Those fibers deposited upon a predetermined portion of the Petri dish would then be counted and their sizes measured. This process would be repeated until a predetermined number of fibers had been counted and measured, thereby permitting the calculation of an average fiber length.

As can be appreciated, this statistical sampling method is time consuming and yields only approximate results at best. More often, the results yielded by this sampling method skew the test results such that the average fiber lengths are reported as being shorter than what actually exists in the sample of composite material. Typically, this is due to breakage of the reinforcing fibers that had been embrittled in the burn-off process in which the fibers were removed from the thermoplastic resin. In addition, because the electrostatic charges present within a camel hair brush commonly used in this process can vary from moment to moment and day to day depending on many environmental factors including humidity, the size and number of reinforcing fibers that may be picked up in a given sampling would not be uniform. As can be appreciated, when the electrostatic forces on the camel hair brush are relatively strong, longer fibers would be picked up by the brush. Conversely, where the electrostatic charge on the brush was relatively low, only shorter fibers would be picked up. Therefore, the results of this prior art type of statistical sampling are variable and tend to report smaller average fiber lengths than what exist in reality.

In order to overcome these problems, the present invention comprises a burn-off procedure in which the reinforcing fibers are annealed, thereby preventing fiber embrittlement that might otherwise increase breakage during the testing process. In addition, the present invention comprises a fractionation process and apparatus that accounts for all of the fibers in a given sample of composite material. In this manner, more accurate results may be obtained. In addition, the process and apparatus of the present invention is faster and easier to use.

SUMMARY OF THE INVENTION

The present invention comprises a method of determining an average length of a reinforcing fiber in a composite material. The method begins with the step of calculating an appropriate size for the sample of composite material. Once this has been completed a sample of the composite material having approximately the calculated sample size is then obtained. Preferably the ratio of the diameter of the sample of composite material to its length is at least 1:25. This ration limits the number of fibers in the sample that are cut in obtaining the sample. Now that the sample has been obtained the resin is removed from the composite material by exposing the sample of composite material to an elevated temperature for a predetermined period of time, after which the reinforcing fibers are annealed to minimize or eliminate breakage of the reinforcing fibers. This process is referred to as "burning-off" the resin. The reinforcing fibers are then weighed to obtain a sample weight.

Preferably the resin is removed from the reinforcing fibers of the composite material by gradually heating the composite to predetermined temperature, holding the composite material at that predetermined temperature for a chosen length of time, and then gradually cooling the remaining reinforcing fibers. The first part of this process, i.e. gradually heating the composite material and holding it at a predetermined temperature, removes the resin by burning and melting it away. A suitable heating regimen has been found to start at a temperature of between approximately 0° C. and 30° C., rising to a temperature of approximately 350° C. at a rate of no more than 10° C. per minute. Once the composite material has reached approximately 350° C., the temperature may be raised relatively quickly to 550° C., where it is held for approximately two hours. Once the resin of the composite material has been burned away, the remaining reinforcing fibers are annealed by gradually cooling the fibers at a rate of no more than 20° C. per minute. The second part of the burning-off process comprises an annealing step that reduces internal stresses in the reinforcing fibers, thereby resulting in a sample of reinforcing fibers that are relatively strong and flexible. This annealing step helps prevent breakage of the fibers that might skew the results of the testing process.

The sample of annealed reinforcing fibers is next placed in a fiber separating mechanism to divide the sample of reinforcing fiber into a plurality of fractions wherein each fraction comprises reinforcing fibers of substantially the same size. Each of the fractions is then weighed and an average fiber length is calculated from the total weight of the reinforcing fibers and the weights of each of the plurality of fractions.

A suitable fiber separator comprises a top section that preferably takes the shape of a hollow cylinder having a length sufficient to enclose therein a predetermined volume, a screen section that also preferably takes the shape of a hollow cylinder of substantially the same diameter as the top section, and a bottom section also preferably taking the shape of a hollow cylinder but having a closed bottom end. The screen section has a predetermined height and a membrane of screen cloth stretched entirely across its inner diameter. The top section, screen section and bottom section of the fiber separator are capable of being coupled to one another so as to form a single hollow cylinder having a closed bottom end.

In use the fiber separator is filled with water and the sample of reinforcing fibers is placed in the water in the top section of the fiber separator. Preferably the water within the fiber separator will be gently stirred for 10 seconds after which the water is allowed to settle for 15 seconds, this cycle being repeated a predetermined number of times and preferably at least three times. Once the reinforcing fibers have been allowed to settle, the bottom portion of the fiber separator is removed and the water is drained out of the separator. The fiber separator is then disassembled and the respective screen portions are dried and then weighed to obtain the weight of the fractions of the fiber material. The method and apparatus of the present invention permit the simple, accurate and rapid assessment of reinforcing fiber size in fiber reinforced thermoplastic composite materials.

These and other objectives and advantages of the invention will appear more fully from the following description, made in conjunction with the accompanying drawings wherein like reference characters refer to the same or similar parts throughout the several views.

DESCRIPTION OF THE DRAWINGS

FIG. 1 is an exploded view of a fiber separator.

FIGS. 2–6 are top plan views of portions of the fiber separator of FIG. 1 taken along the respective view lines 2—2 to 6—6 respectively.

FIG. 7 is an elevational view of the fiber sorter of FIG. 1 as assembled.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention comprises a method for extracting reinforcing fibers from a composite material and analyzing those reinforcing fibers to determine an average length. A fiber separator 10 is utilized to separate the reinforcing fibers into groups of substantially identical length. Typically, the method of the present invention will be used to analyze composite molding materials made from a thermoplastic resin and a reinforcing fiber such as fiberglass. It is to be understood that other types of composite materials may be analyzed using the method of the present invention.

The first step of the method of the present invention is to obtain a suitable sample of a fiber reinforced composite material for examination. Because the point of the method of the present invention is to determine the actual average length of fibers within a particular sample of composite material, it is important to obtain a sample of the composite material in such a manner that minimizes the number of reinforcing fibers that would be cut or otherwise broken in obtaining the sample. Therefore, the cross-sectional area of the sample of composite material that is to be cut is to be minimized in comparison with the overall volume of the desired sample. For example, where the composite material is being extruded in a simple cylinder form, it is preferred to obtain a sample that has a length that is at least 25 times the diameter of the extruded shape.

The quantity of reinforcing fibers in a sample of a composite material that is to be analyzed must also be taken into account. It has been found that placing too large a quantity of reinforcing fibers in a fiber separator 10 (described in detail hereinbelow) has a tendency to clog the fiber separator 10. This can, in turn, result in inaccurate results. Therefore, using the known nominal weight percentage of reinforcing fiber in a composite material sample, an ideal reinforcing fiber sample size may be calculated. The magnitude of the ideal reinforcing fiber sample mass is related to the physical characteristics of the fiber separator 10, and therefore the exact value may vary. However, in a preferred embodiment of the present invention it has been determined that a sample weight of reinforcing fibers of between 0.9 and 1.2 grams of reinforcing fiber provides a statistically significant quantity of fibers that pass easily through the respective filters of the fiber separator. Given the nominal weight percent of reinforcing fibers in a given composite material and the desired dimensional ratios as set forth above, one can easily calculate the dimensions of a suitable sample of fiber reinforced composite material.

Once a suitable sample or samples of the composite material have been secured, the reinforcing fibers of the composite material must be removed from the resin in which they are embedded. Typically, this is done by "burning-off" the resins in an oven. The relatively high temperatures of the oven melt and burn the resin, leaving behind only the reinforcing fibers of the composite material. It will be noted that the preferred material of the fiber reinforced composite material is a glass fiber commonly known as fiberglass. This type of reinforcing fiber easily withstands the temperatures necessary to burn off the resins of the composite material. However, exposure to the high temperatures and the large temperature gradients present when the sample is first placed in an oven, and when the sample is removed from the oven, can severely embrittle the glass reinforcing fibers. Therefore, in a preferred embodiment of the method of the present invention, the resins of the composite material are burned off using a gradual temperature cycle that starts at approximately 0° C., rises gradually (at approximately 10° C. per minute) to 350° C., where it is held for approximately one hour, and then ramped up to approximately 550° C. at any desirable rate. The sample is held at approximately 550° C. for approximately two hours. Immediately thereafter, the temperature in the oven is gradually reduced down to the initial 0° C. at a rate of approximately 20° C. per minute. The gradual rise and fall of the aforementioned temperature cycle reduces or eliminates temperature shocks that would otherwise needlessly embrittle the glass reinforcing fibers. Consequently, the glass reinforcing fibers of the sample of composite material are relatively stronger than those glass reinforcing fibers obtained using prior art methods of burning off the resins.

Note that the burn-off temperature cycle given above may vary in the exact temperatures used and in the time and warming and cooling rates employed. What is important is to avoid embrittlement or breakage of the reinforcing fibers that might occur due to thermal shock. In addition, the physical properties of the reinforcing fibers themselves may require different burn-off temperature cycles to properly anneal the fibers.

Once the glass reinforcing fibers have been fully cooled, it is necessary to sort all of the fibers into groups based on their length. This is done using a fiber separator 10 illustrated in FIGS. 1–7. Referring first to FIG. 1, the fiber separator 10 can be seen to comprise a top section 12, a plurality of screened sections 14, and an end cup 16. FIG. 1 illustrates the fiber separator 10 prior to assembly while FIG. 7 illustrates the fiber separator 10 as it appears when assembled. The various portions of the fiber separator 10 comprise means for interchangeably securing the various portions of the fiber separator 10 to one another in a watertight manner. Preferably, top section 12 and screen sections 14 comprise a male threaded portion 13, 15, respectively. Note that these threaded portions 13, 15 extend from the lower edge of the respective fiber separator portions and meet with a complementary female threaded portion (not shown) at the top edge of each of the respective fiber separator portions. In this manner, the respective portions of the fiber separator 10 may be rapidly assembled or disassembled and may also maintain a watertight seal therebetween. Furthermore, by using interchangeable thread sizes, it is possible to assemble virtually any configuration of portions of the fiber separator 10. It is to be understood that other structures aside from a male-female thread structure may be utilized to connect the portions of the fiber separator 10 to one another without exceeding the scope of the prevention invention.

Top section 12 of fiber separator 10 comprises a hollow cylinder having an uninterrupted bore formed therethrough. See FIG. 2. Screen sections 14 also comprise hollow cylindrical members but differ from top section 12 in that each screened section 14 has a section of screen cloth 20 disposed across its entire cross section. See FIGS. 3–5. The screen cloth 20 of each screen section 14 is constructed and arranged to retain thereon fibers of a predetermined length and to pass fibers smaller than that predetermined length therethrough. As will readily be understood, it is preferred that the uppermost screen section 14 have the coarsest screen cloth 20, with each successively lower screen section 14 having a finer screen cloth 20. In this manner, longer reinforcing fibers will be trapped by the uppermost coarse screen cloth 20, while successively shorter reinforcing fibers will be captured by the successively finer screen cloths 20. While only three screen sections 14 are illustrated, it is to be understood that more or fewer screen sections 14 may be utilized in various configurations of fiber separator 10.

In operation, the respective portions of the fiber separator 10 are connected as illustrated in FIG. 7. The fiber separator 10 is then filled with water and, after the water has settled, a sample of reinforcing fibers is placed into the top section 12. Prior to placing the sample of reinforcing fibers in the fiber separator 10 however, the sample is weighed and the weight recorded.

While it is unlikely that the reinforcing fibers may float, it is possible that the reinforcing fibers may clump together or otherwise be suspended at the surface of the water in the top section 12 due to the surface tension of the water. Therefore, it is preferred to use a small quantity of a dispersal agent such as a mild dish detergent to break the surface tension in the top section 12 of the fiber separator 10.

It is preferred to impart a rotational velocity to the water within the fiber separator 10 so that the reinforcing fibers will be oriented in a plane that is substantially parallel to that of the screen cloth 20 of the various screen sections 14. In this manner the reinforcing fibers will not address the screen cloth 20 longitudinally. While numerous structures and mechanisms may be utilized to impart a rotary motion to the water within the fiber separator 10, it is preferred to manually stir the water in a gentle manner such that no reinforcing fibers are extracted from the water and any breakage of the fibers is minimized or eliminated. Preferably, the water in the top section 12 of the fiber separator 10 is stirred for approximately 10 seconds followed by a rest period of approximately 15 seconds. This cycle of stirring and rest is repeated approximately three times. After the third cycle of stirring and rest has been completed, the end cup portion 16 of fiber separator 10 is removed. This allows the water within the fiber separator 10 to drain and also brings any reinforcing fiber suspended within the water into contact with the screen cloth 20 of the respective screen sections 14 so as to categorize the reinforcing fibers according to length.

Once all the water has drained from the fiber separator 10, the various portions of the fiber separator 10, 14 are disassembled and dried to remove any trace of water. Preferably, the screen sections 14 will be dried using an oven though any suitable drying mechanism or process may be used. When dry, each screen section 14 is weighed to determine a total weight of the screen section 14 plus the reinforcing fiber fraction disposed on the screen cloth 20 thereof. Next, the tare weight of the screen section 14 is subtracted from the gross weight of the screen section 14 and reinforcing fiber sample to obtain the net weight of the fraction of the reinforcing fiber sample that is deposited on the screen cloth 20 of the screen section 14. Using the net weights of the respective fractions of the reinforcing fiber sample that were deposited upon the respective screen portions 14 of the fiber separator 10, an average reinforcing fiber length as well as a distribution of the lengths can accurately and easily be calculated.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of determining an average length of reinforcing fiber in a sample of reinforcing fibers, the method comprising steps of:

weighing a sample of reinforcing fibers to obtain a total sample weight;

placing the sample of reinforcing fibers in a fiber separating mechanism, the fiber separating mechanism comprising a screen section having a hollow cylinder with a predetermined height and a screen material extending across an inner diameter;

suspending the sample of reinforcing fibers in water in the fiber separating mechanism;

stirring the water so that the reinforcing fibers are substantially oriented in a plane that is substantially parallel to a plane defined by the screen material after which the water is allowed to settle such that the sample of reinforcing fiber addresses the screen material substantially along a length dimension of each reinforcing fiber and divides into a plurality of fractions in separate sections of the fiber separating mechanism, each fraction comprising reinforcing fibers having substantially similar lengths;

weighing each of the plurality of fractions; and calculating an average fiber length from the relative weights of each of the plurality of fractions and the total sample weight.

2. The method of claim 1 wherein the stirring step comprises stirring water within the fiber separating mechanism for 10 seconds after which the water is allowed to settle for 15 seconds.

3. The method of claim 1 wherein the stirring step is repeated a predetermined number of times.

4. The method of claim 1 wherein the stirring step is repeated at least three times.

5. The method of claim 1 wherein the screen material comprises a membrane of screen cloth stretched across the inner diameter and wherein the fiber separating mechanism further comprises:

a top section comprising a hollow cylinder having a substantially similar diameter as the screen section and having a length sufficient to enclose therein a predetermined volume; and a bottom section comprising a hollow cylinder having a closed bottom end, the top section, screen section and bottom section being capable of being coupled to one another so as to form a single hollow cylinder having a closed bottom end.

6. The method of claim 5 further comprising a step of removing the bottom portion from the fiber separating mechanism so as to allow the water within the fiber separating mechanism to drain out.

7. A method of determining an average length of a reinforcing fiber in a composite material comprising a resin comprising the steps of claim 1 and further comprising steps of:
obtaining an appropriately sized sample of the composite material;
removing the resin from the composite material by exposing the sample of composite material to an elevated temperature for a predetermined period of time; and
annealing the reinforcing fibers.

8. The method of claim 7 wherein a ratio of the sample of composite material diameter to length is at least 1:25.

9. The method of claim 7 wherein the removing step comprises gradually heating the sample of composite material to remove the resin therefrom starting at a temperature of between 0° and 30° C. and rising to a temperature of approximately 350° C. at a rate of no more than 10 degrees Celsius per minute.

10. The method of claim 7 wherein annealing step comprises exposing the sample of composite material to a temperature of approximately 550° C. for approximately two hours.

11. The method of claim 7 wherein the annealing step comprises cooling the sample of composite material to a final temperature of between 0° and 30° C. at a rate of no more than 20° C. per minute.

12. A method of determining an average length of a reinforcing fiber in a composite material having a plurality of reinforcing fibers, the methods comprising steps of
obtaining an appropriately sized sample of the composite material;
removing the resin from the composite material by exposing the sample of composite material to an elevated temperature for a predetermined period of time;
annealing the remaining reinforcing fibers of the composite material into a sample of reinforcing fibers;
weighing the sample of reinforcing fibers to obtain a total sample weight;
placing the sample of reinforcing fibers in a fiber separating mechanism in a suspension of water;
stirring the water after which the water is allowed to settle such that the sample of reinforcing fiber divides into a plurality of fractions in separate sections of the fiber separating mechanism, each fraction comprising reinforcing fibers having substantially similar lengths;
weighing each of the plurality of fractions; and
calculating an average fiber length from the relative weights of each of the plurality of fractions and the total sample weight.

13. The method of claim 12 wherein the stirring step comprises stirring water within the fiber separating mechanism for 10 seconds after which the water is allowed to settle for 15 seconds.

14. The method of claim 12 wherein the stirring step is repeated a predetermined number of times.

15. The method of claim 12 wherein the fiber separating mechanism comprises:
a top section comprising a hollow cylinder having a length sufficient to enclose therein a predetermined volume;
a screen section comprising a hollow cylinder having a substantially similar diameter as the top section, the screen section having a predetermined height and a membrane of screen cloth stretched across the inner diameter; and
a bottom section comprising a hollow cylinder having a closed bottom end, the top section, screen section and bottom section being capable of being coupled to one another so as to form a single hollow cylinder having a closed bottom end.

16. The method of claim 15 further comprising a step of removing the bottom portion from the fiber separating mechanism so as to allow the water within the fiber separating mechanism to drain out.

17. The method of claim 12 wherein a ratio of the sample of composite material diameter to length is at least 1:25.

18. The method of claim 12 wherein the removing step comprises gradually heating the sample of composite material to remove the resin therefrom starting at a temperature of between 0° and 30° C. and rising to a temperature of approximately 350° C. at a rate of no more than 10 degrees Celsius per minute.

19. The method of claim 12 wherein annealing step comprises exposing the sample of composite material to a temperature of approximately 550° C. for approximately two hours.

20. The method of claim 12 wherein the annealing step comprises cooling the sample of composite material to a final temperature of between 0° and 30° C. at a rate of no more than 20° C. Per minute.

* * * * *